United States Patent
Shipley et al.

(10) Patent No.: US 9,236,744 B2
(45) Date of Patent: Jan. 12, 2016

(54) POWER DISTRIBUTION SYSTEM FOR AN AIRCRAFT

(75) Inventors: Adrian Shipley, Cheltenham (GB); Stephen Curwen, Cheltenhem (GB)

(73) Assignee: GE AVIATION SYSTEMS LIMITED, Cheltenham, Gloucestershire (GB)

( * ) Notice: Subject to any disclaimer, the term of this patent is extended or adjusted under 35 U.S.C. 154(b) by 1013 days.

(21) Appl. No.: 13/225,702

(22) Filed: Sep. 27, 2011

(65) Prior Publication Data

US 2012/0086266 A1    Apr. 12, 2012

(30) Foreign Application Priority Data

Sep. 17, 2010  (GB) .................................. 1015562.0

(51) Int. Cl.
*B60L 1/00* (2006.01)
*H02J 4/00* (2006.01)

(52) U.S. Cl.
CPC ............... *H02J 4/00* (2013.01); *B64D 2221/00* (2013.01)

(58) Field of Classification Search
USPC ......................................................... 307/9.1
See application file for complete search history.

(56) References Cited

U.S. PATENT DOCUMENTS

| | | | | |
|---|---|---|---|---|
| 5,610,452 | A * | 3/1997 | Shimer et al. | ................... 307/89 |
| 6,664,656 | B2 | 12/2003 | Bernier | |
| 6,899,390 | B2 | 5/2005 | Sanfrod et al. | |
| 7,538,521 | B2 | 5/2009 | Berenger | |
| 7,936,082 | B2 | 5/2011 | Boudyaf et al. | |
| 2006/0044722 | A1 | 3/2006 | Wavering et al. | |
| 2006/0119177 | A1 | 6/2006 | Kumar et al. | |
| 2007/0194625 | A1 | 8/2007 | Maier | |
| 2008/0111420 | A1 | 5/2008 | Anghel et al. | |
| 2009/0176417 | A1 * | 7/2009 | Rembach et al. | ...... B63H 21/20 440/6 |
| 2010/0148581 | A1 | 6/2010 | Gupta et al. | |
| 2010/0156171 | A1 * | 6/2010 | Sechrist | ......................... 307/9.1 |
| 2014/0084817 | A1 * | 3/2014 | Bhavaraju et al. | ............ 318/139 |

FOREIGN PATENT DOCUMENTS

| | | |
|---|---|---|
| CN | 101066704 A | 11/2007 |
| CN | 101234672 A | 8/2008 |
| EP | 2405551 A2 | 1/2012 |
| EP | 2470427 A2 | 7/2012 |
| WO | WO2012/012482 A1 * | 1/2012 |

OTHER PUBLICATIONS

EP Search Report in connection with GB patent Application 1015562.0 filed on Sep. 17, 2010, issued Feb. 17, 2011.
A Great Britain Office Action issued in connection with corresponding GB Application No. 1015562.0 on Sep. 8, 2014.
Unofficial English Translation of Chinese Office Action issued in connection with corresponding CN Application No. 201110283539.9 on Dec. 29, 2014.
Unofficial English Translation of Japanese Office Action issued on Jul. 7, 2015 in connection with corresponding JP Application No. 2011201246.

* cited by examiner

*Primary Examiner* — Daniel Cavallari
(74) *Attorney, Agent, or Firm* — GE Global Patent Operation; William S. Munnerlyn

(57) ABSTRACT

A power distribution system which may be provided in an aircraft for example is described, the power distribution system comprising: a power distribution bus and a plurality of localized voltage converters each supplied by the power distribution bus. By providing a plurality of localized voltage converters, the power distribution system may use fewer, or just a single power distribution bus at a particular voltage and convert to the desired voltage at or near to each of a plurality of pieces of electrical equipment being supplied.

14 Claims, 4 Drawing Sheets

POWER DISTRIBUTION SYSTEM FOR AN AIRCRAFT

BACKGROUND OF THE INVENTION

1. Field of the Invention

The field of the present invention generally relates to a power distribution system such as a power distribution system for an aircraft for example.

2. Description of Related Art

One of the primary concerns for aircraft is system weight. Being able to reduce weight reduces an aircraft's fuel consumption and increases its range. An aircraft's structure, fuel, equipment and electrical wiring all contribute to its weight. The weight of electrical wiring and associated equipment for a commercial aircraft may be several hundred kilograms or several tonnes.

It is an aim of an embodiment of the present invention to reduce the weight of an aircraft's electrical wiring and/or associated equipment.

BRIEF SUMMARY OF THE INVENTION

According to a first aspect of the present invention, there is provided a power distribution system for an aircraft for receiving electrical power from one or more aircraft engines, the power distribution system comprising: a power distribution bus and a plurality of localised voltage converters each supplied by the power distribution bus, wherein the localised voltage converters each include a power supply arranged to provide an adjustable output voltage.

By providing a plurality of localised voltage converters, the power distribution system may use fewer, or just a single power distribution bus at a particular voltage and convert, to the desired voltage at or near to each of a plurality of pieces of electrical equipment being supplied. This provides a considerable weight saving in electrical wiring and associated equipment such as transformers/power distribution boxes over conventional systems which typically have at least three power distribution buses along the length of an aircraft, each at a different voltage (typically 28 volts, 115 volts and 230 volts) to supply the various types of electrical equipment provided on the aircraft.

Furthermore, localised voltage converters, which may be provided for one or a few components, are typically much smaller and lighter than a main voltage converter for a bus supplying an entire aircraft at a particular voltage and so may be accommodated far more easily in an aircraft.

According to another aspect there is provided an aircraft comprising a power distribution system comprising: a power distribution bus and a plurality of localised voltage converters each supplied by the power distribution bus.

According to another aspect there is provided an aircraft comprising two or more power distribution systems, each power distribution system comprising: one power distribution bus and a plurality of localised voltage converters each supplied by the power distribution bus

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION OF THE INVENTION

Figure 1:
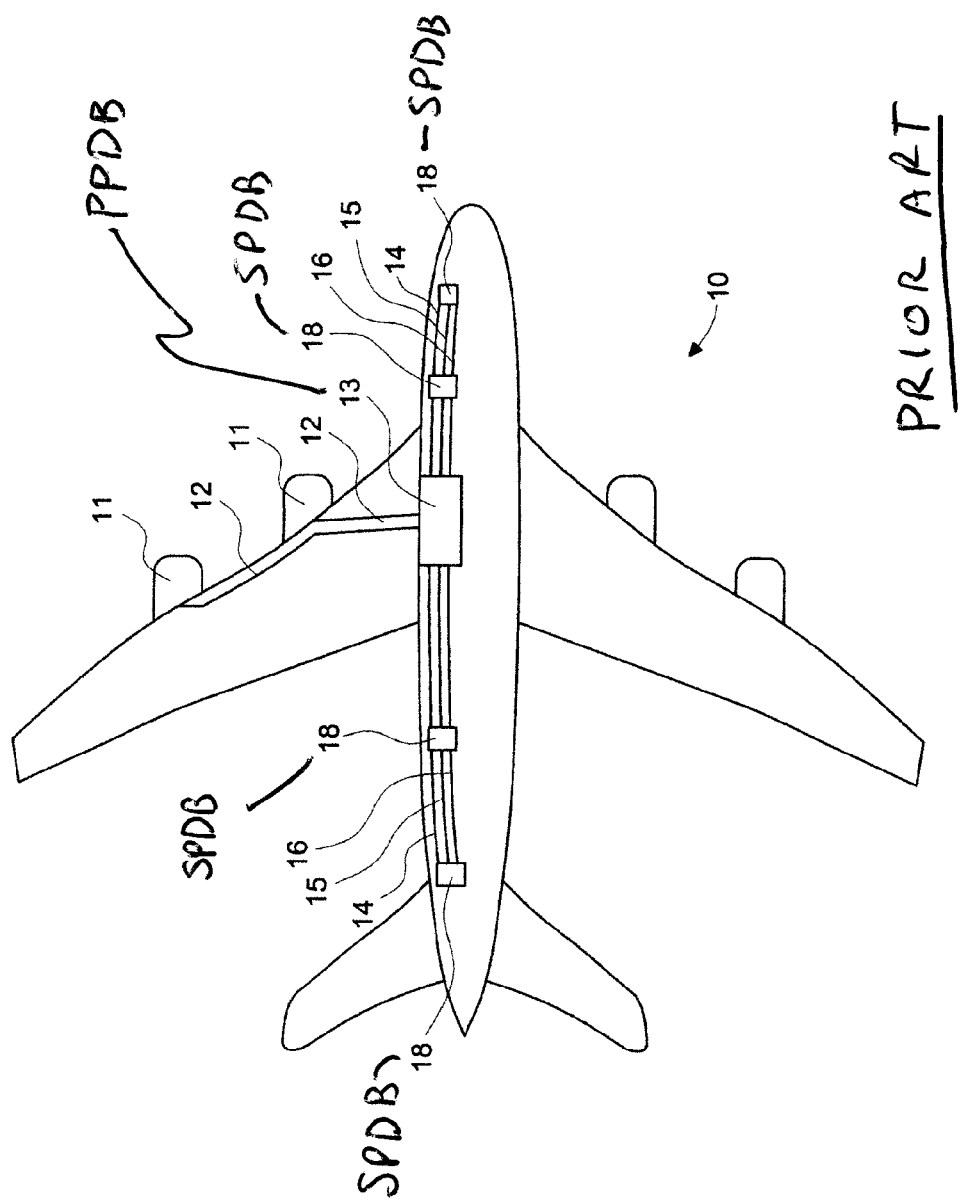
FIG. 1 illustrates a conventional electrical power distribution system in an aircraft.

FIG. 1 illustrates an aircraft 10 provided with a conventional power distribution system. As can be seen, the aircraft is provided with a number of engines 11 which, as well as providing thrust for the aircraft, provide electrical power for various pieces of electrical equipment provided on the aircraft. The aircraft 10 is provided with a Primary Power Distribution Box (PPDB) 13 which receives electrical power from the engines 11 via appropriate electrical connectors 12. The PPDB 13 contains a number of transformers to provide electrical power to at least three power buses 14, 15, 16 each at a different voltage, typically 230 volts AC, 115 volt AC and 28 volts DC, Although a single PPDB13 and corresponding set of buses 14, 15, 16 is shown in FIG. 1, an aircraft may have two or more PPDBs 13 and sets of buses 14, 15, 16. For example a set may be provided on each side of the aircraft 10 or for each engine.

An aircraft typically has a variety of electrical components with differing power load requirements. For example some hydraulic systems, for example for operating flaps on the wings and/or lifting of landing gear will have a higher power load requirement and will typically receive power from the higher voltage bus 14. Other electrical components on the aircraft such as ovens for the galley, instruments for the cockpit and in-flight entertainment for passengers will typically require less power and may be connected to one of the other lower voltage buses 15, 16.

As can be seen in FIG. 1 electrical power is remotely converted to appropriate system voltages at the PPDB 13 and then fed to various secondary power distribution boxes (SPDB) 18 for subsequent distribution to the various aircraft components/loads.

Figure 2:
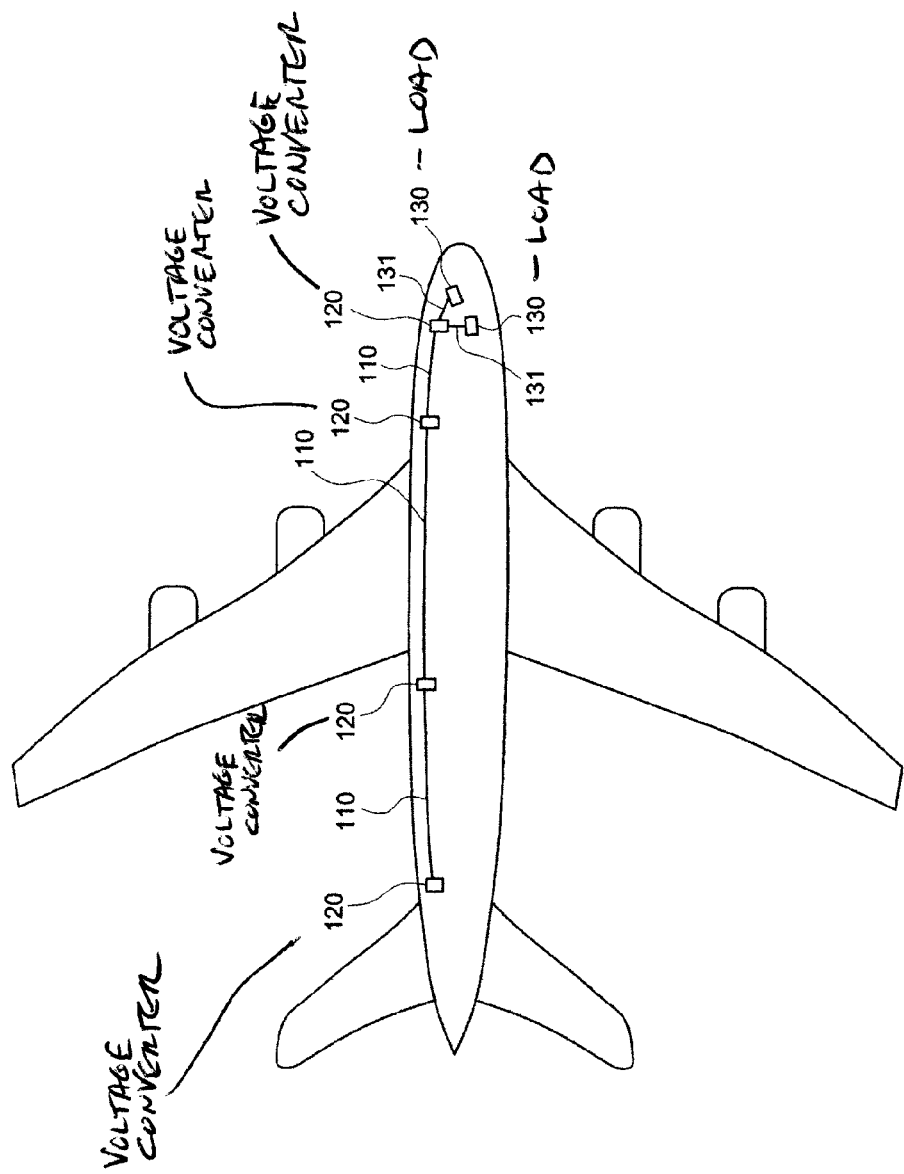
FIG. 2 illustrates a power distribution system of an embodiment illustrating an embodiment of present invention.

FIG. 2 illustrates a power distribution system in accordance with an embodiment of the present invention. In this example, the power distribution system has a power distribution bus 110 and a plurality of localised voltage converters 120. As the localised voltage converters 120 convert the voltage on the bus 110 to the appropriate voltage required by any loads 130 close to the converters 120, a bus 110 operating at only a single voltage is required. This significantly reduces the weight of electrical wiring compared to the arrangement shown in FIG. 1 which requires separate buses 14, 15, 16 each operating at a different voltage. It is preferable that the highest system voltage is employed in the power distribution bus 110 as the size and weight of the wiring to provide the bus 110 may be reduced. When a lower voltage is required for given equipment, (which for the same power will demand a higher current and thus thicker wiring), this will be locally converted by the localised voltage converter 120 and supplied by wiring 131 over a shorter distance. Thus, the lower voltage, higher current, thicker wiring 131 will only be required for the relatively short distances between the localised voltage converters 120 and the appropriate lower voltage load 130, further reducing the weight of the wiring in the power distribution system.

The localised voltage converters 120 may be arranged to supply power at one or two other voltages (e.g. 28 V DC, 115 V AC) as well as at the voltage of the power distribution bus (e.g. 230 V AC).

Figure 3:
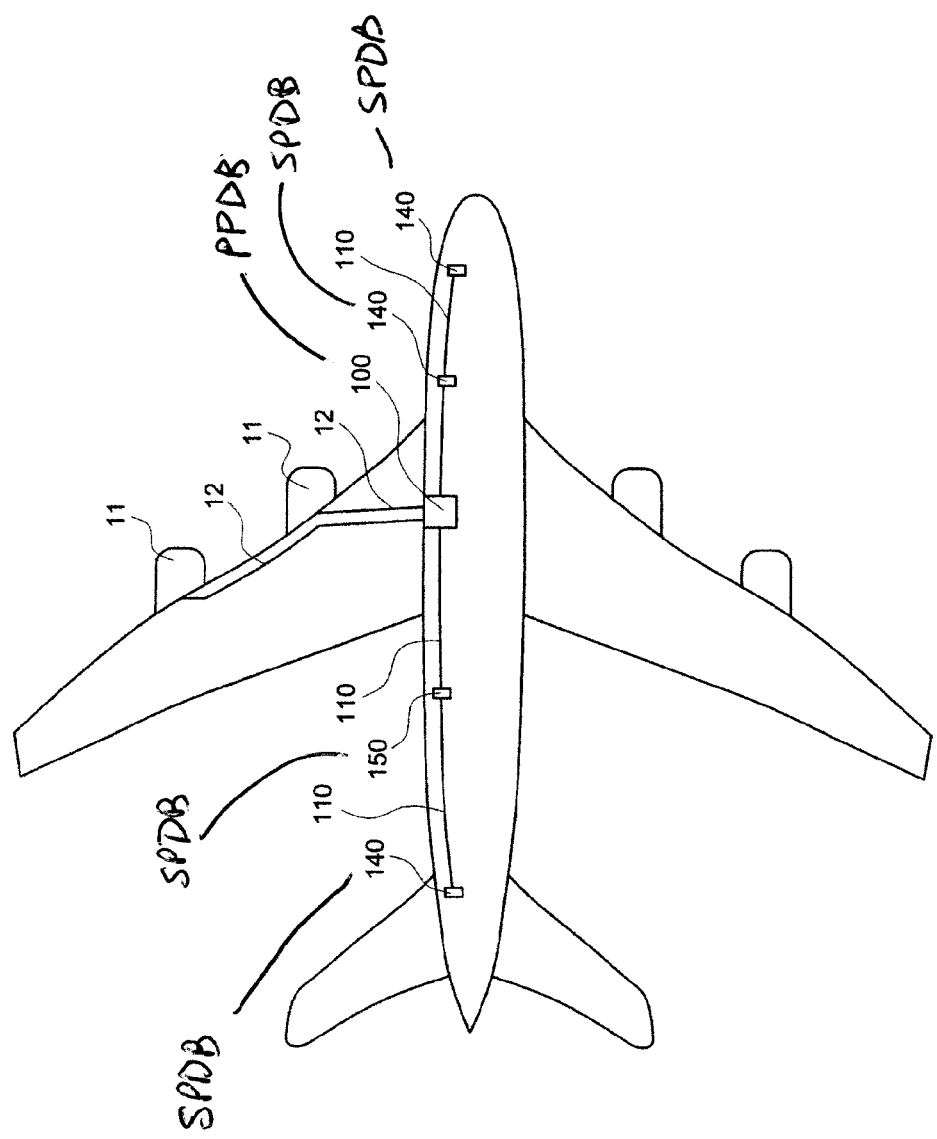
FIG. 3 illustrates a more detailed example of a power distribution system of an embodiment of the present invention.

FIG. 3 shows a more detailed example of the embodiment of the present invention shown in FIG. 2. As shown schematically in this example, the Primary Power Distribution Box (PPDB) 100 can be much smaller than in the conventional power distribution shown FIG. 1 as it is only required to supply one voltage as opposed to the multiple voltages provided by the PPDB 13 illustrated in FIG. 1. The simplified PPDB 100 of an embodiment of the present invention will consequently be significantly smaller, lighter and less expensive than the conventional PPDB 13 thus further saving weight and costs.

The localised voltage converters 120 illustrated in FIG. 2 may be integrated with the Secondary Power Distribution Boxes (SPDB) 140 illustrated in FIG. 3, Whilst the SPDB 140 may be slightly increased in size due to the requirement for a localised voltage converter 120, this is more than made up for the simplification provided by only having to receive one supply voltage from the power distribution bus 110, Thus overall, the SPDBs 140 in embodiments of the present invention are smaller and lighter than conventional examples which receive power from several buses each at a different voltage.

For electrical equipment which requires the voltage provided by the bus 110, a localised voltage converter will not be required at that point and so an even more simplified SPDB 150 may be used which will be arranged to receive only a single voltage from the power distribution bus 110 and which will not require a localised voltage converter. For example, with the power distribution bus 110 arranged to provide the highest available voltage for equipment on the aircraft (in this example 230 V) such as for retracting the landing gear, the SPDB 150 supplying the landing gear retractor will not require any localised voltage conversion.

Consequently, by providing a plurality of localised voltage converters 120 such that the power distribution bus 110 may provide fewer voltages, typically only a single voltage, this provides significant reduction in the weight of electrical wiring for the power distribution bus 110 as well as simplification and thus reductions in weight, size and cost of the PPDB 100 and SPDB 140.

Figure 4:
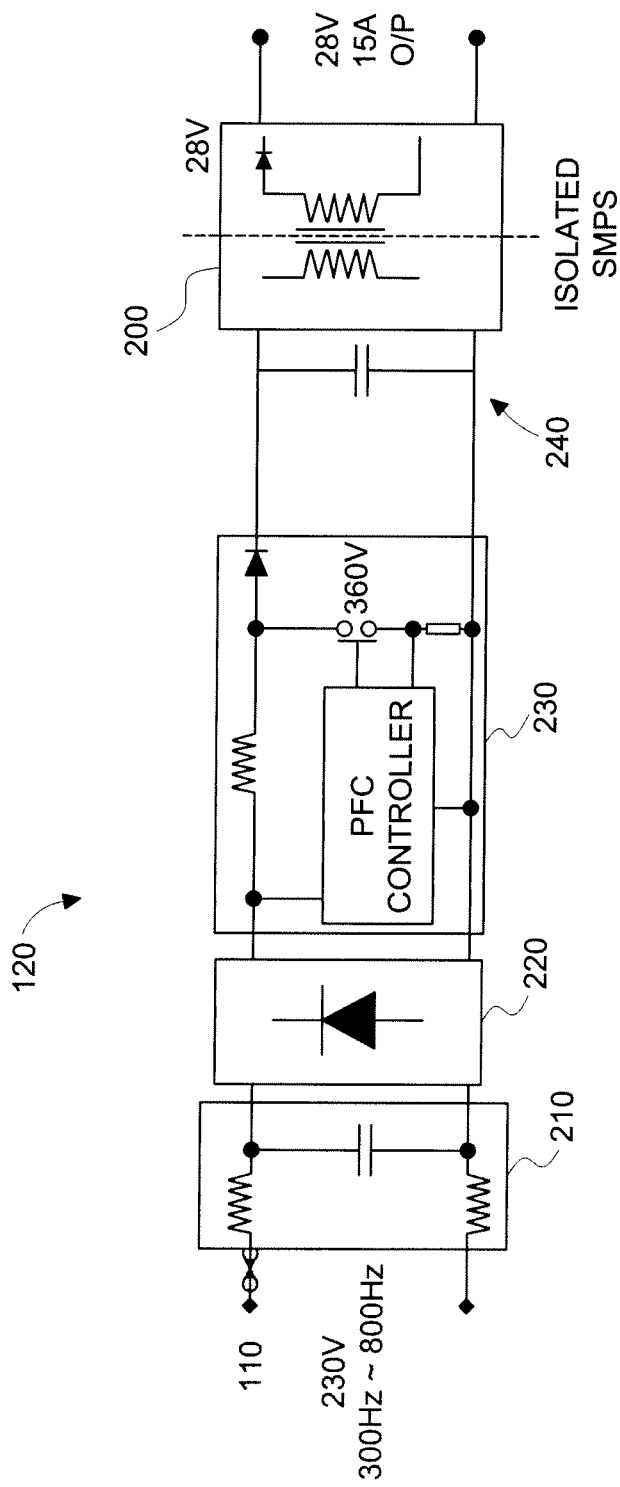
FIG. 4 illustrates a localised power converter.

FIG. 4 illustrates an example of a localised voltage converter 120. In this example the localised voltage converter 120 receives electrical power from the bus 110 at the highest voltage of loads supplied by the power distribution system, which in this example is 230 volts AC. The localised voltage converter 120 provides an output at a lower voltage, which for many aircraft may be, for example, 115 volts AC or 28 volts DC, but in this example is 28 volts DC.

The localised voltage converter 120 of this example includes a Switch Mode Power Supply (SMPS) transformer arrangement 200. The SMPS transformer arranged of this example is provided with the appropriate windings to be able to step up and step down to provide the desired output voltage, in this example 28 volts. In this example, the localised voltage converter 120 also includes a capacitor 210/diode arrangement 220 to provide AC/DC conversion and a Power Factor Correction Stage 230 to reduce phase shift. The SNIPS arrangement 200 is provided with a unity power factor by the high voltage intermediate rail 240.

As explained above, the power distribution bus 110 preferably operates at only a single voltage and that this single voltage is preferably at the highest voltage of loads/electrical equipment supplied by the power distribution system, in this example 230 volts AC. As the bus operates at just the higher voltage, consequently, the electrical wiring of the bus 110 may be thinner than that of buses supplying a lower voltage which consequently would have a higher current. The power distribution bus 110 preferably also provides AC power. By operating at a relatively high switching frequency, preferably 10 kHz or above, more preferably higher than 50 kHz, a physically smaller, lighter and efficient localised voltage converter 120 may be provided. Providing a smaller and lighter localised voltage converter 120 enables it to be integrated into the aircraft structure more easily without requiring the provision of dedicated supports etc. realising further weight reduction and simplification.

Although embodiments of the present invention have been described above with reference to the accompanying drawings, many variations may be made to the examples provided without departing from the present invention. For example, an aircraft may be provided with only one two or more power distribution systems. Furthermore, each power distribution system may receive power from one or more engines.

What is claimed is:

1. A power distribution system for an aircraft, comprising:
a primary power distribution box configured to receive electrical power from at least one aircraft engine, and supply power to a power distribution bus at a single voltage; and
a plurality of localised voltage converters each supplied by the power distribution bus, wherein the localized voltage converters each comprise a power supply configured to provide an adjustable output voltage.

2. A power distribution system according to claim 1, having only a single power distribution bus.

3. A power distribution system according to claim 1, wherein the power distribution bus is configured to operate at just one voltage.

4. A power distribution system according to claim 1, further comprising two or more secondary power distribution boxes, each secondary power distribution box comprising a localised voltage converter, wherein each secondary power distribution box is configured to receive only a single voltage from the power distribution bus and supply power to one or more loads at a different voltage from that provided by the power distribution bus.

5. A power distribution system of claim 1, wherein the power distribution system is configured to supply electrical power at a voltage utilized by at least one of a plurality of loads included in the power distribution system.

6. A power distribution system according to claim 1, wherein the plurality of localised voltage converters are configured to supply power at one other voltage as well as at the voltage of the power distribution bus.

7. A power distribution system according to claim 1, wherein the plurality of localised voltage converters are configured to supply power at two other voltages as well as at the voltage of the power distribution bus.

8. A power distribution system according to claim 1, wherein the plurality of localised voltage converters comprise Switch Mode Power Supply (SMPS) transformer arrangements configured to operate at a switching frequency of 10 kHz or above.

9. An aircraft comprising a power distribution system for receiving electrical power from one or more aircraft engines, the power distribution system comprising:
a primary power distribution box configured to receive the electrical power from the one or more aircraft engines, and supply power to a power distribution bus at a first voltage; and
a plurality of localised voltage converters each supplied the first voltage by the power distribution bus, the localized voltage converters each comprising a power supply configured to provide an adjustable output voltage.

10. An aircraft according to claim 9, wherein the power distribution system further comprises two or more secondary power distribution boxes, each secondary power distribution box comprising a localised voltage converter, wherein each secondary power distribution bus is configured to receive the first voltage from the power distribution box and supply power to one or more loads at a different voltage from that provided by the power distribution bus.

11. An aircraft of claim 9, wherein the first voltage is equal to a voltage used by at least one load.

12. An aircraft according to claim 9, wherein the plurality of localised voltage converters are configured to supply power at a second voltage and the first voltage.

13. An aircraft according to claim 9, wherein the plurality of localised voltage converters are configured to supply power at the first voltage and a plurality of other voltages.

14. An aircraft comprising two or more power distribution systems configured to utilize electrical power from one or more aircraft engines, each power distribution system comprising:
- a primary power distribution box configured to receive electrical power from the one or more aircraft engines, and supply power to one power distribution bus at a first voltage; and
- a plurality of localised voltage converters each supplied the first voltage by the power distribution bus, the localized voltage converters each comprising a power supply configured to provide an adjustable output voltage.

* * * * *

UNITED STATES PATENT AND TRADEMARK OFFICE
CERTIFICATE OF CORRECTION

| | | |
|---|---|---|
| PATENT NO. | : 9,236,744 B2 | Page 1 of 1 |
| APPLICATION NO. | : 13/225702 | |
| DATED | : January 12, 2016 | |
| INVENTOR(S) | : Shipley et al. | |

It is certified that error appears in the above-identified patent and that said Letters Patent is hereby corrected as shown below:

Title Page, (75), under "Inventors", in Column 1, Line 2, delete "Cheltenhem (GB)" and insert -- Cheltenham (GB) --, therefor.

Specification

In Column 1, Line 35, delete "convert," and insert -- convert --, therefor.

In Column 2, Line 21, delete "DC," and insert -- DC. --, therefor.

In Column 3, Line 14, delete "FIG. 3," and insert -- FIG. 3. --, therefor.

In Column 3, Line 18, delete "110," and insert -- 110. --, therefor.

In Column 3, Line 57, delete "SNIPS" and insert -- SMPS --, therefor.

In Column 4, Line 14, delete "one" and insert -- one, --, therefor.

Signed and Sealed this
Seventh Day of June, 2016

Michelle K. Lee
*Director of the United States Patent and Trademark Office*